Feb. 8, 1949.   H. W. CUSTER   2,461,374
RECEPTACLE SUPPORTING RACK
Original Filed Oct. 13, 1944
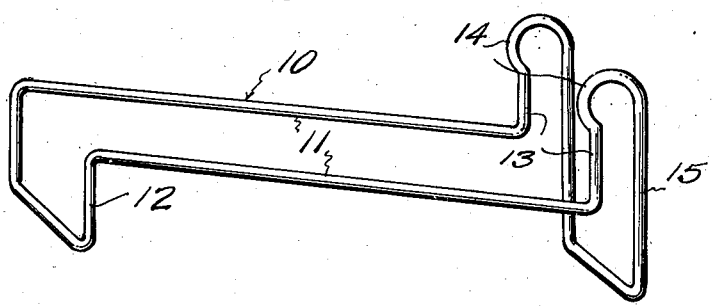
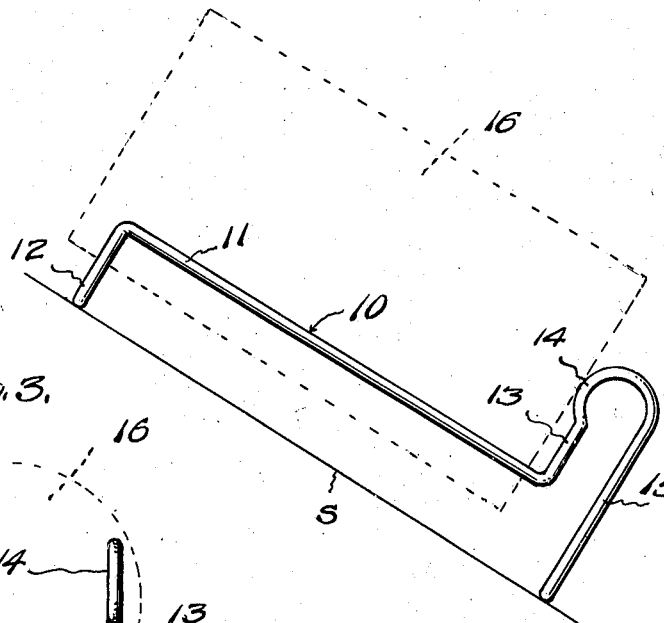
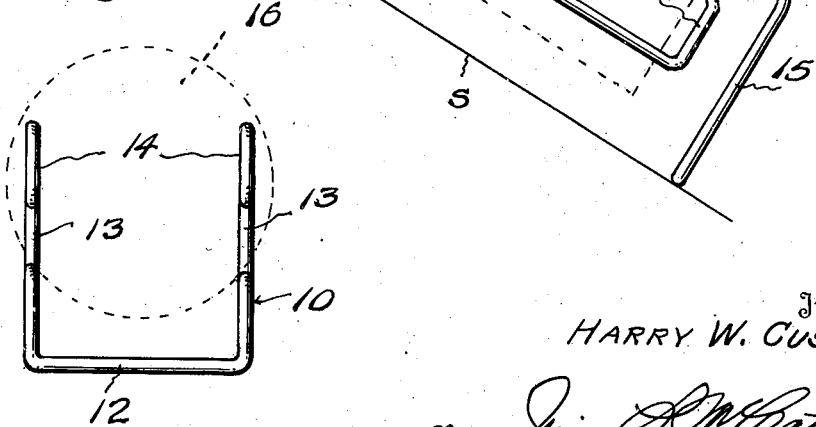
Inventor
HARRY W. CUSTER Patented Feb. 8, 1949

2,461,374

UNITED STATES PATENT OFFICE 2,461,374

RECEPTACLE SUPPORTING RACK

Harry W. Custer, Center Line, Mich.

Original application October 13, 1944, Serial No. 558,510. Divided and this application September 24, 1945, Serial No. 618,157

1 Claim. (Cl. 248—175)

This invention relates to a receptacle supporting rack and has for one of its objects the production of a simple and efficient rack for supporting tubular receptacles and the like in a manner whereby the body of the receptacle is supported between two parallel members and the end of the receptacle is supported in spaced relation to the end of the rack.

A further object of this invention is the production of a rack which is especially designed to support a tubular receptacle at an inclined position within a freezing cabinet and the like and provide a minimum contact between the rack and the receptacle while at the same time providing an adequate support for the receptacle.

Other objects and advantages of the present invention will appear throughout the following specification and claim.

In the drawing:

Figure 1 is a perspective view of the rack;

Figure 2 is a side elevation of the rack in a receptacle-supporting position;

Figure 3 is a front elevational view of the rack.

The present application is a divisional application of my application filed October 13, 1944, Serial Number 558,510, and relating to Ice cream cabinets.

By referring to the drawing, it will be seen that 10 designates the rack which is preferably formed of a strand of suitable metal such as wire, steel, bar material, and the like. This rack 10 comprises a pair of parallel side members 11, which terminate at their forward ends in a downwardly extending right-angularly arranged U-shaped loop 12. The opposite or rear ends of the side members 11 terminate in upwardly extending members 13, the upper ends of which are formed into forwardly bowed loop portions 14 projecting beyond the members 13. These loop portions 14 extend parallel to the side members 11 and the extremities of the loop portions 14 are bent downwardly to form a depending U-shaped loop 15. These loop portions 12 and 15 support the parallel side members 11 above the face of a support S indicated in Figure 2. The support S is in the nature of an inclined bottom face of an angular well of an ice cream cabinet, freezer and the like, such as is shown in my application above identified.

An ice cream can 16, shown in dotted lines in Figures 2 and 3, is adapted to be placed longitudinally of the rack as shown. The can 16, because of the structure of the rack is adapted to lie or rest upon the parallel side members 11, and since the can is circular in cross-section or tubular in formation, a portion of the can hangs down between the side members 11. The rack may therefore hold the can against lateral shifting or displacement. The rear end of the can will abut against the forwardly bowed loop portions 14 and will be supported against a minimum resistance or contact surface at its rear end. Because of the particular construction of the rack, it should be noted that the rack will support a can placed thereon in a manner whereby a minimum contact surface is in engagement with the can, thereby facilitating the removal or detachment of the can from the rack with a minimum effort. Consequently, a minimum contact surface is provided upon the rack 10 which would be likely to freeze solidly to the can or other container which it may support.

The rack above described may be made of steel bar material of a suitable strength to support the can 16 which rests thereon. Furthermore, the present structure is adaptable for use in cabinets of any type, such as freezing, cooling or other units, without departing from the spirit of the invention.

Certain detail changes in the construction may be employed without departing from the spirit of the invention, so long as such changes fall within the scope of the appended claim.

Having described the invention, what is claimed is:

As a new article of manufacture, a rack for supporting tubular receptacles and the like, formed of a strand of material, said rack comprising a pair of spaced parallel longitudinally extending members constituting receptacle-supporting side track-rails, a depending U-shaped loop supporting the front end of said rails, said rails terminating at their opposite rear ends in upwardly extending parallel portions, the upwardly extending parallel portions merging into forwardly projecting loop portions, the forwardly projecting loop portions in turn terminating in a downwardly extending U-shaped loop portion providing a support for the rear end of the rack, the upwardly extending parallel portions and the forwardly projecting loop portions extending in alignment, the track-rails providing supports upon which a tubular receptacle rests and extends below the rails to hold the receptacle against lateral displacement, the rails also constituting parallel tracks for supporting the receptacle for longitudinal slidable movement upon the track-rails.

HARRY W. CUSTER.

REFERENCES CITED

The following references are of record in the file of this patent:

UNITED STATES PATENTS

| Number | Name | Date |
|---|---|---|
| 1,180,735 | Murray | Apr. 25, 1916 |

FOREIGN PATENTS

| Number | Country | Date |
|---|---|---|
| 631,788 | France | Dec. 26, 1927 |